United States Patent [19]

Huber

[11] Patent Number: 5,220,125
[45] Date of Patent: Jun. 15, 1993

[54] UNITIZED SHOCK ISOLATION AND MISSILE SUPPORT SYSTEM

[75] Inventor: Michael S. Huber, Milpitas, Calif.

[73] Assignee: Westinghouse Electric Corp., Pittsburgh, Pa.

[21] Appl. No.: 692,814

[22] Filed: Jan. 18, 1985

[51] Int. Cl.$^5$ .............................................. F41F 3/04
[52] U.S. Cl. .................................. 89/1.816; 89/1.809
[58] Field of Search ................ 89/1.816, 1.810, 1.809, 89/1.8; 52/403; 277/199, 152

[56] References Cited

U.S. PATENT DOCUMENTS

| | | | |
|---|---|---|---|
| 3,072,022 | 1/1963 | Wood et al. | 89/1.810 X |
| 3,124,040 | 3/1964 | Fiedler | 89/1.816 |
| 3,166,978 | 1/1965 | Price et al. | 89/1.816 |
| 3,289,533 | 12/1966 | Brown | 89/1.810 |
| 3,367,235 | 2/1968 | Andrews | 89/1.816 |
| 3,857,321 | 12/1974 | Cohen | 89/1.816 X |
| 3,899,260 | 8/1975 | Kerschner | 52/403 X |
| 4,118,019 | 10/1978 | Weir | 267/153 |
| 4,399,999 | 8/1983 | Wold | 89/1.816 X |
| 4,406,211 | 9/1983 | Anderson | 89/1.816 |
| 4,433,848 | 2/1984 | Williams | 89/1.816 X |

*Primary Examiner*—David H. Brown
*Attorney, Agent, or Firm*—D. Schron

[57] ABSTRACT

A unitized shock isolation and support system disposed in an annular space between two cylindrical surfaces utilizing a first compressible portion axially oriented chevron-shaped prebuckled struts to support a rigid or semirigid hoop larger in diameter than the inner cylinder and second compressible portion or a foam liner disposed on the inner diameter of the hoop, the foam liner being thicker than the annular space between the inner cylinder and the hoop to form a space efficient system mitigating shock and for laterally supporting the inner cylindrical surface within the outer cylindrical surface.

10 Claims, 3 Drawing Sheets

UNITIZED SHOCK ISOLATION AND MISSILE SUPPORT SYSTEM

GOVERNMENT CONTRACT

The Government has rights in this invention pursuant to Contract No. N0003081-C-0105 between Westinghouse Electric Corporation and the Department of Defense.

CROSS-REFERENCE TO RELATED APPLICATIONS

U.S. Pat. Application Ser. No. 06/524,812, entitled "Dual Plateau Shock Absorbing Pad", now abandoned and Ser. No. 06/640,426, entitled "Utilized Shock Absorbing Pad", pending, are closely related to this application.

BACKGROUND OF THE INVENTION

This invention relates to shock absorbing and support pads for a missile launching system and more particularly to a shock isolation and support system which has two separate deflection mechanisms incorporated therein.

Missile launch systems have used multiple rows of cast elastomeric shock absorbing pads to line the launch tube wall and laterally support the missile as described in U.S. Pat. No. 4,406,211. Such lateral support systems are used to maintain stored missile alignment, limit shock and vibration inputs to the missile, and control lateral excursion of the missile during the launch. The circular arc-shaped pads herebefore utilized are comprised of a multitude of prebuckled chevron-shaped struts which serve as isolation elements. The pressure deflection curves of thes pads with the chevron strut design can be characterized: as initially pressure rises sharply from small deflections, then the pressure remains fairly constant for an appreciable amount of deflection, and finally as the struts begin to fall flat or bottom out the pressure rises sharply with small deflections. The amount of pad precompression needed to provide proper lateral support with various launcher and missile tolerance buildups tends to create high axial friction forces due to the initial pressure to deflection characteristics and thus impairs on-loading, off-loading and launch of the missile.

Another general problem with chevron strut elastic elements utilized in the prior art systems is that the load path and strut geometry can suddenly change dramatically with small changes in applied loads or load direction. The circular arc shaped pads presently used incorporate shear struts to minimize this tendency, but the shear struts complicate the manufacturing process and do not completely eliminate the problem.

The dual plateau pads described in the related application noted above was developed to satisfy the shock and vibration mitigating requirements, while limiting the axial friction loads between the missile and the support system. The corrugated face of these pads are designed to compress before the chevron-shaped struts begin to deflect. Thus the corrugations are to take the amount of precompression required to compensate for the tolerance buildup in the missile and launch system. However, the prebuckled chevron-shaped struts and corrugation contact surface do not provide the optimum method of transferring the load to the missile skin or outer surface, and the segmented pads tend to collapse and pull away from the missile as eject pressure flows by during the launch.

SUMMARY OF THE INVENTION

A unitized shock isolation and support system disposed between a launch tube and a missile, when made in accordance with this invention, comprises a plurality of arcuate sheets fastened to the launch tube, a continuous hoop ring spaced annularly with respect to the plurality of arcuate sheets, a structured geometric configuration extending between the arcuate sheets and the continuous hoop ring and a compressible member disposed inside the continuous hoop ring and fastened thereto.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
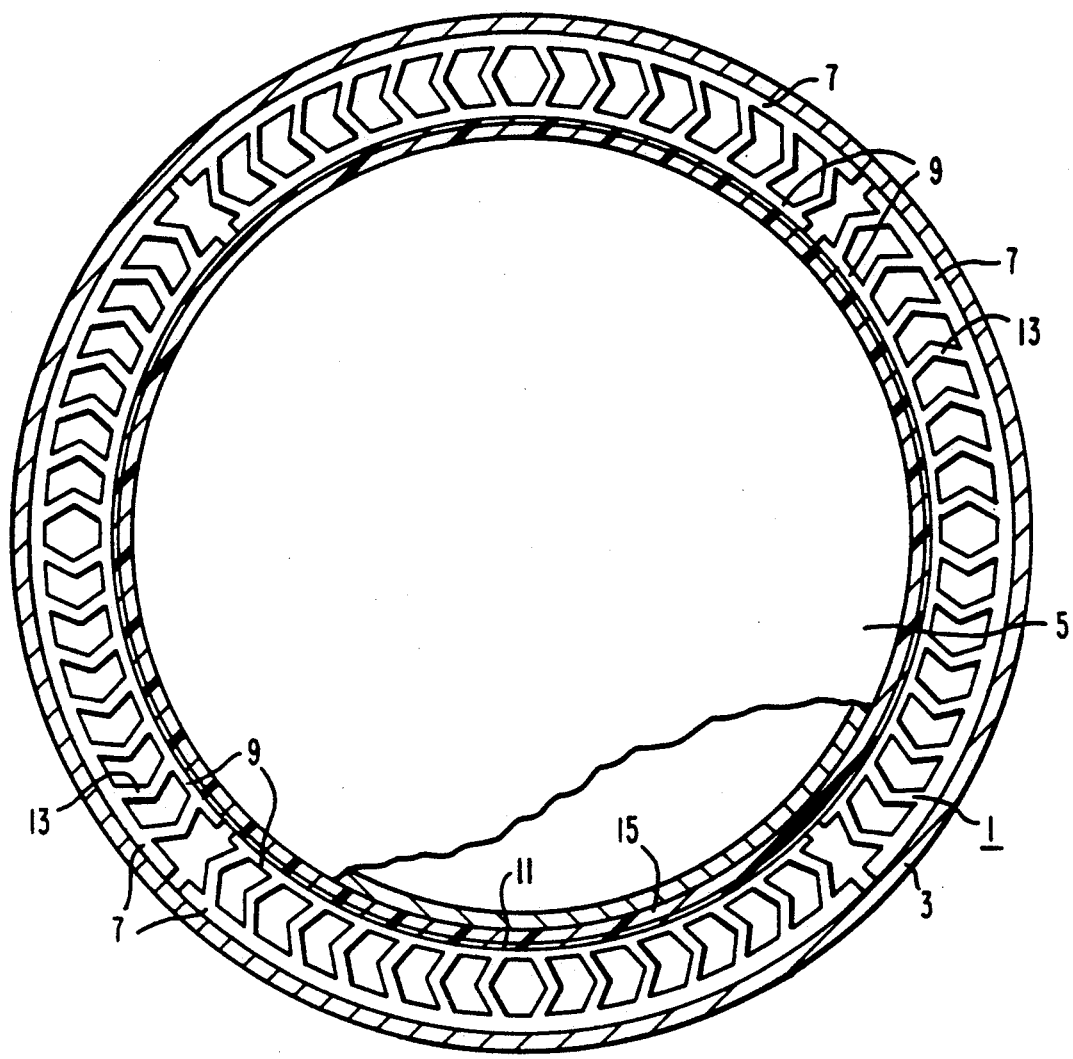
FIG. 1 is a partial sectional view of a launch tube showing a unitized shock isolation and support system made in accordance with this invention.
Figure 2:
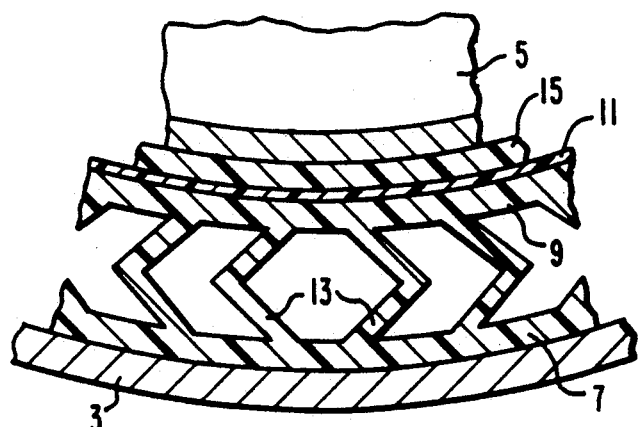
FIG. 2 is an enlarged partial sectional view of the unitized shock isolation and support system.

Referring now to the drawings in detail and in particular to FIGS. 1 and 2 there is shown a unitized shock isolation and lateral support system 1 disposed between a launch tube 3 and a missile 5 having a skin or outer shell 6. The unitized shock isolation and lateral support system 1 comprises a first plurality of arcuate sheets 7 fastened to the launch tube 3; a second plurality of arcuate sheets 9 spaced annularly from the first arcuate sheets 7; a continuous hoop ring 11 made integral with the second arcuate sheets 9 or fastened thereto by adhesives or other means; and a plurality of axially oriented chevron-shaped struts 13 or other structured geometric configuration extending between the first and second arcuate sheets 7 and 9 or between the first arcuate sheets 7 and the hoop ring 11. While a plurality of arcuate sheets are shown continuous arcuate or circular sheets with or without a single gap could be utilized.

The hoop ring 11 is preferably made of a rigid or semirigid composite material such as an epoxy or phenolic resin composite having graphite or aramid wound fiber disposed therein and formed into a wide thin wall tubular section or ring which is integrally molded into a polyurethane shock isolation pads or adhesively fastened to the inner arcuate sheets 9 thereof.

The inner diameter of the hoop ring 11 is larger than the outer diameter of the missile 5 to provide annular clearance therebetween to allow for the buildup of tolerances in the missile diameter. A foam inner liner 15 or other compressible member is disposed on the inner surface of the hoop ring 11. The thickness of the compressible member or foam liner 15 is greater than the annular clearance between the missile 5 and the hoop ring 11 so that the foam is partially compressed when the missile 5 is loaded into the launch tube 3.

The chevron-shaped struts 13 extending from the first plurality of arcuate sheets are divided into two groups for each sheet. In one group the chevron-shaped struts 13 are oriented in one direction and in the other group the chevron-shaped struts 13 are oriented in the opposite direction with the apexes of the chevron-shaped struts facing away from each other.

Figure 3:
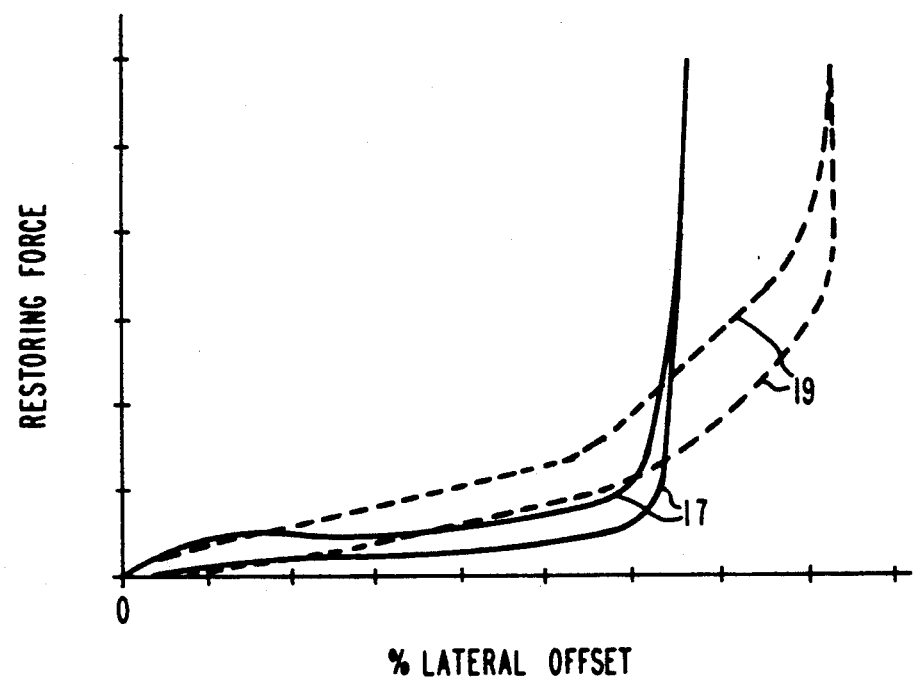
FIG. 3 is a restoring force vs. lateral offset curve for the unitized shock isolation and support system and a prior art shock isolation and support system.

FIG. 3 shows restoring force vs. lateral offset curves which utilize a solid line 17 to represent the restoring force for on load and off load values of a shock isolation and support pads with prebuckled chevron-shaped struts and a dotted line 19 is utilized to represent the restoring force for on load and off load values of the unitized shock isolation and support system 1.

Figure 4:
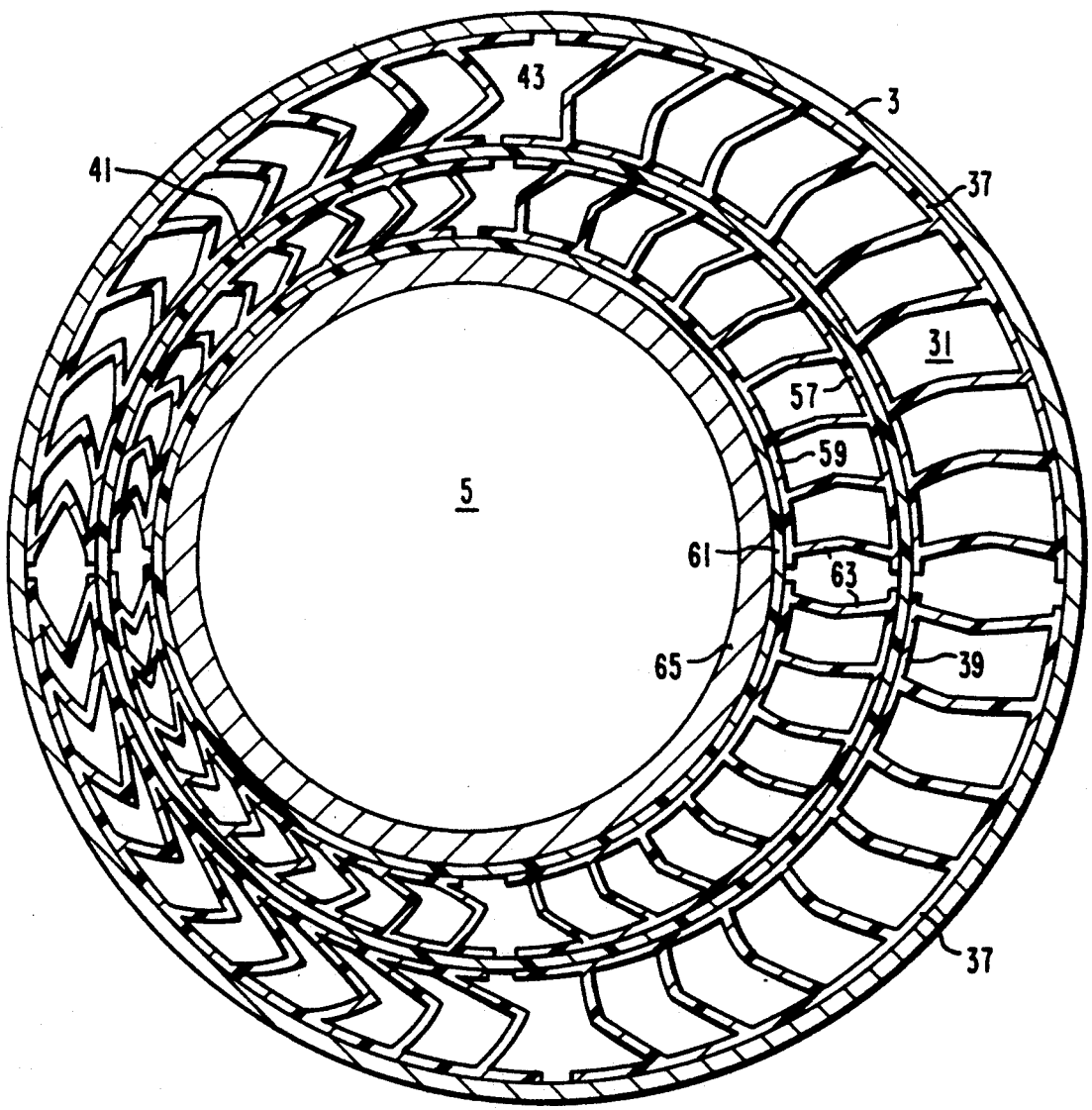
FIG. 4 is a partial sectional view of an alternative unitized shock isolation and support system.

FIG. 4 shows an alternative embodiment of a unitized shock isolation and support system 31 disposed between the launch tube 3 and missile 5. The unitized shock isolation and support system 31 comprises a first plurality of arcuate sheets 37 fastened to the launch tube 3, a second plurality of arcuate sheets 39 spaced annularly from the first arcuate sheets 37 and a continuous hoop ring 41 made integral with the second arcuate sheets 39 or fastened thereto by adhesives or other means. A plurality of axially oriented chevron-shaped struts 43 or other structured geometric configuration extends between the first and second arcuate sheets 37 and 39 or between the first arcuate sheets 37 and the continuous hoop ring 41. While separate arcuate sheets are. shown it is understood that a single circular arcuate sheet could be utilized with or without a gap.

A third plurality of arcuate sheets 57 are fastened to the continuous hoop ring 41 by adhesives are made integral therewith. A fourth plurality of arcuate sheets 59 are spaced annularly from the third plurality of arcuate sheets 57 and a -second continuous hoop ring 61 is made integral with or fastened to a plurality of arcuate sheets 59 by adhesives or other means of a plurality of axially oriented chevron-shaped struts 63 or other structured geometric configuration extending between the third and fourth plurality of arcuate sheets 57 and 59 or between the continuous hoop rings 41 and 61. Disposed within the second continuous hoop ring 61 in a compressible member 65, which is adapted to receive a missile 5. Here a number of unitized shock isolation and support systems are spaced annularly in order to provide a space efficient system with force-deflection characteristics which can be adjusted by modifying one or more of the constituents of the system. Thus it is possible to tune some the constituents of the system to mitigate the low amplitude motions characteristic of vibratory motion while also tuning other constituents to absorb the large amplitude motion occurring during shock.

The unitized shock isolation and support system 1 hereinbefore described advantageously provides a uniform precompression force over a large area, a uniformly loaded missile skin during lateral excursions by virtue of the integrally disposed hoop ring, a reduction in system cost, due to the simplified strut geometry, and maintenance of unitized suspension system restoring forces on the trailing end of the missile even during periods of high gas flow caused by seal uncorking.

What is claimed is:

1. A unitized shock isolation and support system disposed between a launch tube and a missile, said unitized shock isolation and support system comprising:
   a arcuate sheet fastened to said launch tube;
   a continuous hoop ring spaced annularly with respect to said arcuate sheet;
   a structured geometric configuration extending between said arcuate sheet and said continuous hoop ring; and
   a compressible member disposed inside said continuous hoop ring and fastened thereto.

2. A unitized shock isolation and support system as set forth in claim 1, wherein the structured geometric configuration comprises struts.

3. A unitized shock isolation and support system as set forth in claim 1, wherein the arcuate sheet is adhesively fastened to the launch tube.

4. A unitized shock isolation and support system as set forth in claim 1, wherein the compressible member is a foam ring which in its free state is thicker than the annular space between the continuous hoop ring and the missile.

5. A unitized shock isolation and support system as set forth in claim 1, wherein there are a plurality of arcuate sheets disposed in a circular array and each sheet is fastened to the launch tube.

6. A unitized shock isolation and support system as set forth in claim 4, wherein the structured geometric configuration comprises struts which extend from each arcuate sheet to the continuous hoop ring and are divided into at least two groups and the struts in one group face one direction and the struts in the other group face the opposite direction.

7. A unitized shock isolation and support system as set forth in claim 4 and further comprising a second plurality of arcuate sheets annularly spaced with respect to the first-mentioned plurality of arcuate sheets and the structured geometric configuration comprises struts which extend between said arcuate sheets and the continuous hoop ring is fastened to the inner surface of the second plurality of arcuate sheets.

8. A unitized shock isolation and support system disposed in an annular space between two cylindrical members said unitized shock isolation and support system comprising:
   a first arcuate sheet fastened to one of said cylindrical members;
   a first continuous hoop ring spaced annularly with respect to said first arcuate sheet;
   a structured geometric configuration extending between said first arcuate sheet and said first continuous hoop ring;
   a second continuous hoop ring spaced annularly with respect with said first continuous hoop ring;
   a structured geometric configuration extending between said first and second continuous hoop rings; and
   a compressible member disposed within said second continuous hoop ring.

9. A unitized shock isolation and support system as set forth in claim 8, wherein there are a plurality of arcuate sheets disposed in a circular array and fastened to said one cylindrical member.

10. A unitized shock isolation and support system as set forth in claim 9, wherein said compressible member is a foam liner.

* * * * *